US008428459B2

(12) United States Patent
Park et al.

(10) Patent No.: US 8,428,459 B2
(45) Date of Patent: Apr. 23, 2013

(54) OPTICAL I/O BUS SYSTEM

(75) Inventors: Hyo Hoon Park, Daejeon (KR); Tae Woo Lee, Daejeon (KR); Mu Hee Cho, Daejeon (KR); Seong Woon Kim, Chungcheongnam-Do (KR); Min Hyuk Lee, Kimhae-Si (KR)

(73) Assignee: KAIST (Korea Advanced Institute of Science and Technology), Daejeon (KR)

( * ) Notice: Subject to any disclaimer, the term of this patent is extended or adjusted under 35 U.S.C. 154(b) by 548 days.

(21) Appl. No.: 12/705,220

(22) Filed: Feb. 12, 2010

(65) Prior Publication Data

US 2011/0116795 A1 May 19, 2011

(30) Foreign Application Priority Data

Nov. 16, 2009 (KR) ........................ 10-2009-0110106

(51) Int. Cl.
*H04J 14/00* (2006.01)
(52) U.S. Cl.
USPC .................................. 398/51; 398/46; 398/49
(58) Field of Classification Search .............. 398/45–51, 398/60, 140–142
See application file for complete search history.

(56) References Cited

U.S. PATENT DOCUMENTS

| 7,453,835 | B1 * | 11/2008 | Coty et al. ..................... 370/310 |
| 2004/0047371 | A1 * | 3/2004 | Lentine et al. ................. 370/535 |
| 2008/0186667 | A1 * | 8/2008 | Verdiell et al. ................. 361/686 |

FOREIGN PATENT DOCUMENTS

| KR | 1020000062142 | 10/2000 |
| KR | 1020040029458 | 4/2004 |

OTHER PUBLICATIONS

Korean Office Action for 10-2009-0110106, citing the above reference(s).

* cited by examiner

*Primary Examiner* — Dzung Tran
(74) *Attorney, Agent, or Firm* — Lowe Hauptman Ham & Berner, LLP

(57) ABSTRACT

An optical input/output (I/O) bus system for connecting a plurality of external devices with a central processing unit (CPU) or memory in a specific system using an optical signal is provided. The optical I/O bus system includes a serializer and deserializer (SerDes) connected with the CPU or memory, and configured to divide a serial electrical signal into parallel electrical signals or combine parallel electrical signals into a serial electrical signal, a photoelectric converter prepared between the SerDes and the external devices, and configured to convert the serial/parallel electrical signals into an optical signal or an optical signal into an electrical signal, a plurality of optical transmission means disposed in parallel to transfer the optical signal converted by the photoelectric converter, an optical switch prepared between the photoelectric converter and the optical transmission means, and configured to switch to one of the optical transmission means to transfer the optical signal converted by the photoelectric converter to the optical transmission means according to an address of the optical signal, and a plurality of optical slots connected to the respective optical transmission means to connect the external devices so that the optical signal is input/output. In the optical I/O bus system, a high-capacity signal can be transferred without distortion, interference, and bottleneck using optical connection technology.

6 Claims, 3 Drawing Sheets

OPTICAL I/O BUS SYSTEM

CROSS-REFERENCE TO RELATED APPLICATION

This application claims priority to and the benefit of Korean Patent Application No. 2009-110106, filed on Nov. 16, 2009, the disclosure of which is incorporated herein by reference in its entirety.

BACKGROUND

1. Field of the Invention

The present invention relates to an optical input/output (I/O) bus system, and more particularly, to an optical I/O bus system that is implemented using an optical printed circuit board (PCB) and optical connection technology in a computer system, etc. and thus can transfer a high-capacity signal without a bottleneck and signal distortion occurring in a conventional I/O bus system.

2. Discussion of Related Art

In general, a computer bus system refers to an information transmission channel that is used in common by a central processing unit (CPU) and external devices including a memory and I/O device to transfer information between them in a computer.

Information transferred via such a bus system may be an address of each device or an address in a memory at which information exists, that is, information of an address, information of data, or so on. Each piece of information is transferred and received over an appropriate bus.

Also, buses may be classified into an internal bus that is used to connect several arithmetic units in a CPU with various registers or a plurality of arithmetic units with each other, and an external bus that connects a plurality of CPUs with each other, a CPU with an external device including a memory, or external devices with each other. The present invention relates to the external bus, and more particularly, to a connection method and structure in the physical layer of the external bus.

Due to an increase in the speed of microprocessor units (MPUs) and memory chips, a rapid increase in the amount of information to be processed by peripheral devices, and an increase in the number of required peripheral devices, the amount of information to be transferred over a bus rapidly increases. However, the bandwidths of I/O buses are not so improved that a bottleneck frequently occurs in the I/O buses. Also, since a plurality of external devices are connected in parallel, a severe signal distortion occurs.

I/O buses are intended to connect external devices with the CPU of a computer, and classified into a first generation bus, a second generation bus, and a third generation bus according to a data throughput, standard, and time. The first generation bus includes an Industry Standard Architecture (ISA) bus, Extended ISA (EISA) bus, MicroChannel Architecture (MCA) bus, etc., and the second generation bus includes a Video Electronics Standards Association (VESA) bus, Peripheral Component Interconnect (PCI) bus, Accelerated Graphics Port (AGP) bus, etc. A PCI extended (PCI-X) bus and 64-bit PCI bus modified from the PCI bus were developed, but could not support a sufficient bandwidth to resolve a bottleneck. For this reason, the third generation bus such as PCI-express and Hyper-transfer has been developed. However, as long as a bandwidth required in a computer continuously increases, a next-generation bus is necessary.

In such a conventional I/O bus system, asymmetric computer information transmission occurs due to the different speeds of respective devices and a characteristic of a transmission structure. The asymmetric information transmission leads to a bottleneck, and a bottleneck at a specific part decreases the speed of a whole system.

Also, when a conventional I/O bus system transfers an electrical signal at a rate of about 5 Gbps or more, mutual interference occurs due to an electromagnetic (EM) field generated by rapid movement of electrons and results in a signal loss.

Furthermore, since a plurality of different external devices are simultaneously connected to a conventional computer I/O bus system, an impedance mismatch occurs. Thus, signals are severely distorted, and the number of connectable external devices is limited.

SUMMARY OF THE INVENTION

The present invention is directed to an optical input/output (I/O) bus system that is implemented using an optical printed circuit board (PCB) and optical connection technology in a computer system, etc. and thus can transfer a high-capacity signal without a bottleneck and signal distortion occurring in a conventional I/O bus system.

According to an aspect of the present invention, there is provided an optical I/O bus system for connecting a plurality of external devices with a central processing unit (CPU) or memory in a specific system using an optical signal, including: a serializer and deserializer (SerDes) connected with the CPU or memory, and configured to divide a serial electrical signal into parallel electrical signals or combine parallel electrical signals into a serial electrical signal; a photoelectric converter prepared between the SerDes and the external devices, and configured to convert the serial/parallel electrical signals into an optical signal or an optical signal into an electrical signal; a plurality of optical transmission units disposed in parallel to transfer the optical signal converted by the photoelectric converter; an optical switch prepared between the photoelectric converter and the optical transmission units, and configured to switch to one of the optical transmission units to transfer the optical signal converted by the photoelectric converter to the optical transmission units according to an address of the optical signal; and a plurality of optical slots connected to the respective optical transmission units to connect the external devices so that the optical signal is input/output.

Here, the optical signal converted by the photoelectric converter may be transferred to the optical switch through an optical PCB.

The optical I/O bus system may further include: at least one auxiliary photoelectric converter connected with the optical switch through at least one of the optical transmission units, and configured to convert an electrical signal into an optical signal or an optical signal into an electrical signal; at least one auxiliary SerDes connected with the auxiliary photoelectric converter, and configured to divide a serial electrical signal into parallel electrical signals or combine parallel electrical signals into a serial electrical signal; and at least one electrical slot connected with the auxiliary SerDes to connect the external devices so that the serial/parallel electrical signals are input/output.

According to another aspect of the present invention, there is provided an optical I/O bus system for connecting a plurality of external devices with a CPU or memory in a specific system using an optical signal, including: a first SerDes connected with the CPU or memory, and configured to divide a serial electrical signal into parallel electrical signals or combine parallel electrical signals into a serial electrical signal; a first photoelectric converter prepared between the first Ser- Des and the external devices, and configured to convert the serial/parallel electrical signals into an optical signal or an optical signal into an electrical signal; a plurality of optical transmission units disposed in parallel to transfer the optical signal converted by the first photoelectric converter; an optical switch prepared between the first photoelectric converter and the respective optical transmission units, and configured to switch to one of the optical transmission units to transfer the optical signal converted by the first photoelectric converter to the optical transmission units according to an address of the optical signal; a plurality of second photoelectric converters connected in parallel with the optical switch through the respective optical transmission units, and configured to convert the optical signal transferred through the optical transmission units into an electrical signal or an electrical signal into the optical signal; a plurality of second SerDeses connected with the respective second photoelectric converters, and configured to divide a serial electrical signal into parallel electrical signals or combine parallel electrical signals into a serial electrical signal; and a plurality of electrical slots connected with the respective second SerDeses to connect the external devices so that the serial/parallel electrical signals are input/output.

Here, the optical signal converted by the first photoelectric converter may be transferred to the optical switch through an optical PCB.

The optical I/O bus system may further include at least one optical slot connected with at least one of the optical transmission units to connect the external devices so that the optical signal is input/output.

According to yet another aspect of the present invention, there is provided an optical I/O bus system for connecting a plurality of external devices with a CPU or memory in a specific system using an optical signal, including: an array module including a laser diode (LD) array configured to convert an electrical signal output from the CPU or memory into an optical signal, a photonic diode (PD) array configured to convert the optical signal output from the external devices into an electrical signal, a transceiver array configured to transceive the electrical signals, and a controller configured to control the PD array, the LD array, and the transceiver array to connect the CPU or memory with a corresponding external device using the optical signal according to an address of an input signal; a plurality of optical transmission units disposed in parallel to transfer the optical signal converted by the array module; and a plurality of optical slots connected to the respective optical transmission units to connect the external devices so that the optical signal is input/output.

Here, the optical I/O bus system may further include: at least one photoelectric converter connected with the array module through at least one of the optical transmission units, and configured to convert an electrical signal into an optical signal or an optical signal into an electrical signal; at least one SerDes connected with the photoelectric converter, and configured to divide a serial electrical signal into parallel electrical signals or combine parallel electrical signals into a serial electrical signal; and at least one electrical slot connected with the SerDes to connect the external devices so that the serial/parallel electrical signals are input/output.

According to still another aspect of the present invention, there is provided an optical I/O bus system for connecting a plurality of external devices with a CPU or memory in a specific system using an optical signal, including: an array module including an LD array configured to convert an electrical signal output from the CPU or memory into an optical signal, a PD array configured to convert an optical signal output from the external devices into an electrical signal, a transceiver array configured to transceive the electrical signals, and a controller configured to control the PD array, the LD array, and the transceiver array to connect the CPU or memory with a corresponding external device using the optical signal according to an address of an input signal; a plurality of optical transmission units disposed in parallel to transfer the optical signal converted by the array module; a plurality of photoelectric converters connected to the array module through the respective optical transmission units, and configured to convert an electrical signal into an optical signal or an optical signal into an electrical signal; a plurality of SerDeses connected with the respective photoelectric converters, and configured to divide a serial electrical signal into parallel electrical signals or combine parallel electrical signals into a serial electrical signal; and a plurality of electrical slots connected to the respective SerDeses to connect the external devices so that the serial/parallel electrical signals are input/output.

Here, the optical I/O bus system may further include a plurality of optical slots connected to at least one of the optical transmission units to connect the external devices so that the optical signal is input/output.

The specific system may be a computer system.

The optical transmission units may be formed by stacking an optical waveguide made of an optical fiber or polymer on a PCB.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
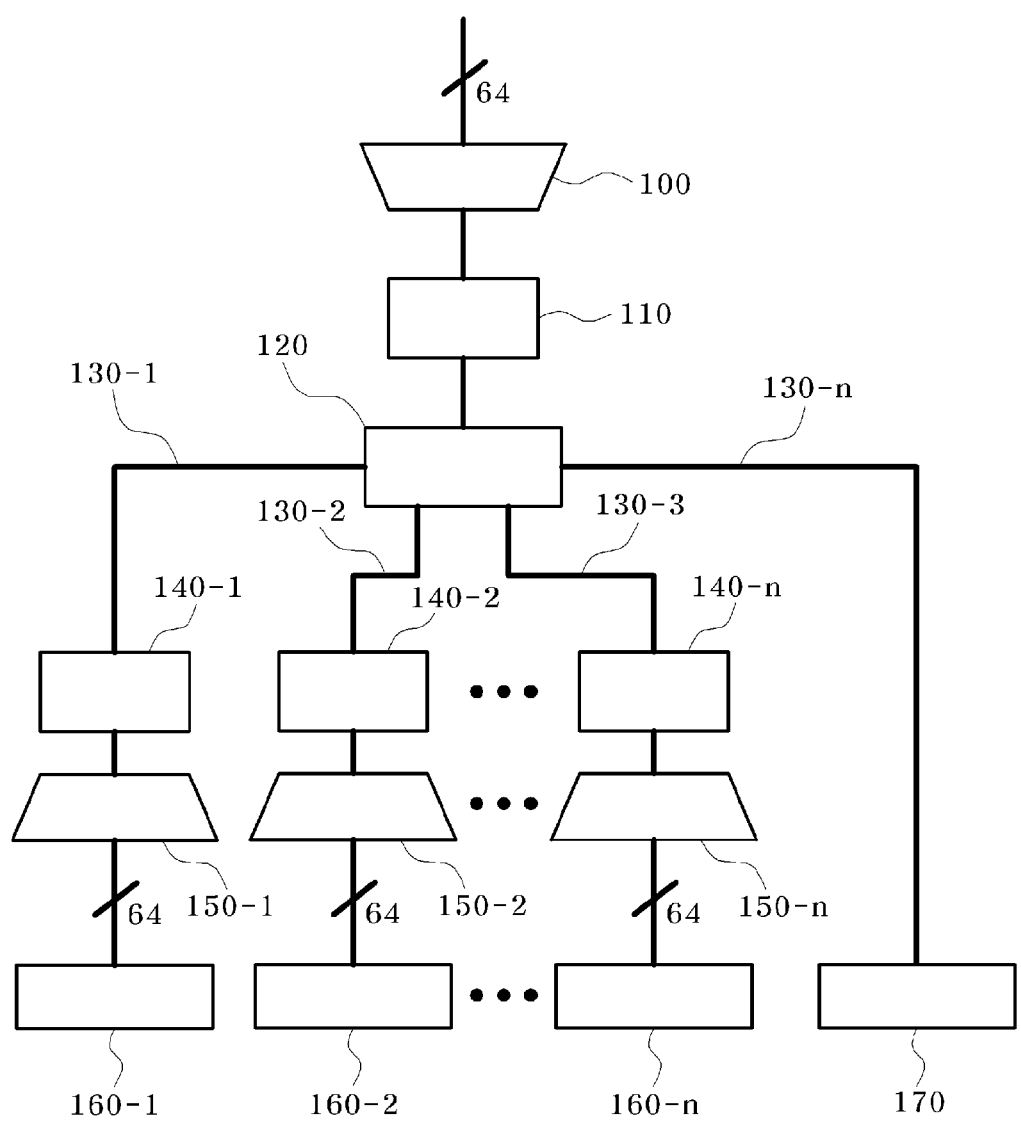
FIG. 1 is a block diagram schematically illustrating an optical input/output (I/O) bus system according to a first exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

An optical input/output (I/O) bus system according to an exemplary embodiment of the present invention briefly includes a unit for converting an optical signal into an electrical signal or vice versa, a unit for performing multiplexing and demultiplexing of a signal, an optical transmission unit for transferring an optical signal, a unit for switching between optical transmission units transferring an optical signal, and so on.

In other words, an I/O bus system according to an exemplary embodiment of the present invention is intended to overcome the limit of an electrical connection caused by a rapid increase in the amount of transmission data in computers. In particular, an exemplary embodiment of the present invention relates to the structure and implementation of an optical I/O bus system that can solve the problems of distortion, interference, bottleneck, etc. in an I/O bus using optical connection technology.

The optical connection technology employed in an exemplary embodiment of the present invention refers to technology for transferring an optical signal through an optical waveguide stacked in a printed circuit board (PCB), the technology including photoelectric conversion technology and signal processing.

To be specific, the optical connection technology currently may be optical PCB technology whereby an optical fiber, polymer, etc., is stacked in a PCB and can be used as an optical waveguide instead of an electrical transmission line. Also, technology for bending such an optical PCB and connecting the optical PCB with an external device with as little loss as possible, and technology for designing and assembling an appropriate module to connect an external electrical device have been suggested.

To implement an I/O bus system according to an exemplary embodiment of the present invention, an electrical device and optical device are needed. To appropriately convert a signal between the electrical device and an optical PCB, a laser diode (LD) and photonic diode (PD) are needed. Also, to transfer a converted signal at an appropriate signal level, a transmitter integrated circuit (IC) or receiver IC is needed. Further, a serializer and deserializer (SerDes) that demultiplexes a serial electrical signal into parallel electrical signals or multiplexes parallel electrical signals into a serial electrical signal, and a signal processor and switching technique that switch according to a given address are needed.

In exemplary embodiments of the present invention, a bus system from a central processing unit (CPU) in a specific system, for example, a computer system to a slot connected with an external device is implemented as an optical I/O bus using an optical transmission unit (e.g., an optical PCB).

Meanwhile, in exemplary embodiments of the present invention, a specific system is a general computer system. However, the specific system is not limited to the general computer system but may be any system including a CPU and/or a memory (e.g., a personal digital assistant (PDA), cellular phone, or audio system).

<First Exemplary Embodiment>

FIG. 1 is a block diagram schematically illustrating an optical I/O bus system according to a first exemplary embodiment of the present invention.

Referring to FIG. 1, the optical I/O bus system according to the first exemplary embodiment of the present invention is intended to connect a plurality of external devices (e.g., a universal serial bus (USB) device, a peripheral component interconnect (PCI) device, a cellular phone, and a PDA) with a CPU and/or a memory in a specific system (e.g., a computer system) using an optical signal. The optical I/O bus system briefly includes a first SerDes 100, a first photoelectric converter 110, an optical switch 120, a plurality of optical transmission modules 130-1 to 130-n, a plurality of photoelectric converters 140-1 to 140-n, a plurality of second SerDeses 150-1 to 150-n, a plurality of electrical slots 160-1 to 160-n, and so on.

Here, the first SerDes 100 converts a serial/parallel signal. For example, the first SerDes 100 is connected with a CPU and/or a memory of a computer system, and functions to multiplex a serial electrical signal into parallel electrical signals or demultiplex parallel electrical signals into a serial electrical signal.

To be specific, the first SerDes 100 collects N bit signals supported by the CPU and/or the memory and converts the N bit signals into a 1 bit signal having a transfer rate N times that of the N bit signals or a 2 bit signal having a transfer rate N/2 times that of the N bit signals, or divides a 1 bit signal having a transfer rate N times that of the N bit signals or a 2 bit signal having a transfer rate N/2 times that of the N bit signals into N bit or N/2 bit signals.

Also, the first SerDes 100 is a circuit including a latch, a multiplexer (MUX), etc., and functioning to combine parallel electrical signals into a serial electrical signal or vice versa. A high-speed SerDes supporting an operating speed of about 40 Gbps or more may be needed in an exemplary embodiment of the present invention, but a SerDes supporting an operating speed less than 40 Gbps can constitute an exemplary embodiment of the present invention.

The first photoelectric converter 110 is connected to the first SerDes 100 in series between the first SerDes 100 and an external device (e.g., a USB device, a PCI device, a cellular phone, or a PDA) (not shown). The first photoelectric converter 110 functions to convert an electrical signal combined by the first SerDes 100 into an optical signal, or an optical signal into an electrical signal.

In other words, the first photoelectric converter 110 is intended to appropriately convert an electrical signal used by the CPU and/or the memory and the external device into an optical signal to be transferred through the optical transmission modules 130-1 to 130-n. The first photoelectric converter 110 may include a PD that converts an optical signal into an electrical signal, an LD that converts an electrical signal into an optical signal, a transceiver or a transmitter and receiver that transfer and receive an electrical signal.

The optical switch 120 controls a system bus connected with the CPU and/or memory, etc. and an I/O bus connected with the external device to appropriately communicate with each other. The optical switch 120 is connected between the first photoelectric converter 110 and the optical transmission modules 130-1 to 130-n, and functions to switch to one of the optical transmission modules 130-1 to 130-n according to the address of an optical signal converted by the first photoelectric converter 110 so that the optical signal is transferred to the optical transmission module.

The optical switch 120 may be a high-speed switch that has low latency and an operating speed of about 40 Gbps or more, but a switch having an operating speed less than 40 Gbps can constitute an exemplary embodiment of the present invention.

The optical signal converted by the first photoelectric converter 110 may be transferred to the optical switch 120 through, for example, an optical PCB.

The optical transmission modules 130-1 to 130-n are connected in parallel with the optical switch 120, and function to smoothly transfer the optical signal converted by the first photoelectric converter 110.

The optical transmission modules 130-1 to 130-n may be implemented by an optical PCB. In the optical PCB, an optical waveguide may be stacked on a PCB. For example, an optical waveguide made of a polymer, fiber, waveguide, etc. is stacked in the PCB so that an optical signal can be transferred through the optical waveguide.

An optical signal may be transferred through the optical PCB. However, an exemplary embodiment of the present invention is not limited to the optical PCB, and any other type of optical waveguide may be used to achieve the purpose of the invention.

In other words, the optical PCB may be formed of a multi-termination (MT) ferrule, fiber, polymer, or so on. In an optical PCB used to constitute an optical bus, a fiber or polymer is stacked on a PCB. Here, the fiber or polymer may be formed of various materials, and also a structure in which the PCB is stacked and transceiving a signal may be diverse.

The second photoelectric converters 140-1 to 140-n are connected in parallel with the optical switch 120 through the optical transmission modules 130-1 to 130-n, respectively. Like the first photoelectric converter 110, the second photoelectric converters 140-1 to 140-n function to convert an electrical signal into an optical signal or an optical signal into an electrical signal.

The second SerDeses 150-1 to 150-n divide a high-speed optical signal according to the standard of the electrical slots 160-1 to 160-n. The second SerDeses 150-1 to 150-n are connected with the second photoelectric converters 140-1 to 140-n respectively, and function to divide a serial electrical signal into parallel electrical signals or combine parallel electrical signals into a serial electrical signal, like the first SerDes 100.

In other words, the second SerDeses 150-1 to 150-n perform multiplexing and demultiplexing to divide a serial electrical signal into parallel electrical signals and combine parallel electrical signals into a serial electrical signal. To be specific, the second SerDeses 150-1 to 150-n combine N bit signals of the external device into a high-speed 1 bit signal, or divide a high-speed 1 bit signal into N bit electrical signals. Here, N may vary according to the standard of the system, and is currently 32 or 64 in general.

The electrical slots 160-1 to 160-n are connected with the second SerDeses 150-1 to 150-n respectively, and are compatible with conventional electric devices to connect the external device so that serial/parallel electrical signals are input/output.

In addition, at least one optical slot 170 that is connected with at least one of the optical transmission modules 130-1 to 130-n to connect the external device so that an optical signal is input/output may be further included.

In other words, when the external device is compatible with an optical signal, the second photoelectric converters 140-1 to 140-n and the second SerDeses 150-1 to 150-n are not needed, and a high-speed optical signal can be transferred to the external device through the optical transmission modules 130-1 to 130-n and the optical slot 170. Thus, performance can be further improved.

The first exemplary embodiment of the present invention includes the electrical slots 160-1 to 160-n and the optical slot 170. However, an exemplary embodiment of the present invention is not limited to this case, and may include the electrical slots 160-1 to 160-n only, a plurality of optical slots 170 only, or the optical slots 170 and at least one of the electrical slots 160-1 to 160-n.

Next, operation of the optical I/O bus system according to the first exemplary embodiment of the present invention will now be described in detail. In the case of the optical I/O bus system according to the signal system of a widely used 64 bit PCI bus, a 64 bit signal of the north bridge is transferred to the first SerDes 100, and the first SerDes 100 converts the 64 bit signal into a combined high-speed 1 bit signal or combined high-speed 2 bit signal and transfers the high-speed signal to the first photoelectric converter 110. Then, the high-speed signal is converted into an optical signal by the first photoelectric converter 110, and transferred to the optical switch 120 through the optical PCB.

Subsequently, the optical switch 120 transfers the high-speed signal to an appropriate optical transmission module 130-1, 130-2, . . . , or 130-n in the I/O bus including the optical transmission modules 130-1 to 130-n.

The optical signal is transferred to a slot through the optical transmission module 130-1, 130-2, . . . , or 130-n, and the slot may be a slot that can input/output an optical signal, that is, the optical slot 170. However, when the slot is a general slot that cannot input/output an optical signal, that is, one of the electrical slots 160-1 to 160-n, the optical signal needs to be processed again through the corresponding second photoelectric converter 140-1, 140-2, . . . , or 140-n and the corresponding second SerDes 150-1, 150-2, . . . , or 150-n.

In other words, the optical signal is converted into an electrical signal by the corresponding second photoelectric converter 140-1, 140-2, . . . , or 140-n, divided into 64 bit signals by the corresponding second SerDes 150-1, 150-2, . . . , or 150-n, and then transferred to the external device connected to the corresponding electrical slot 160-1, 160-2, . . . , or 160-n. To transfer a signal of the external device, the reverse process is performed.

<Second Exemplary Embodiment>

Figure 2:
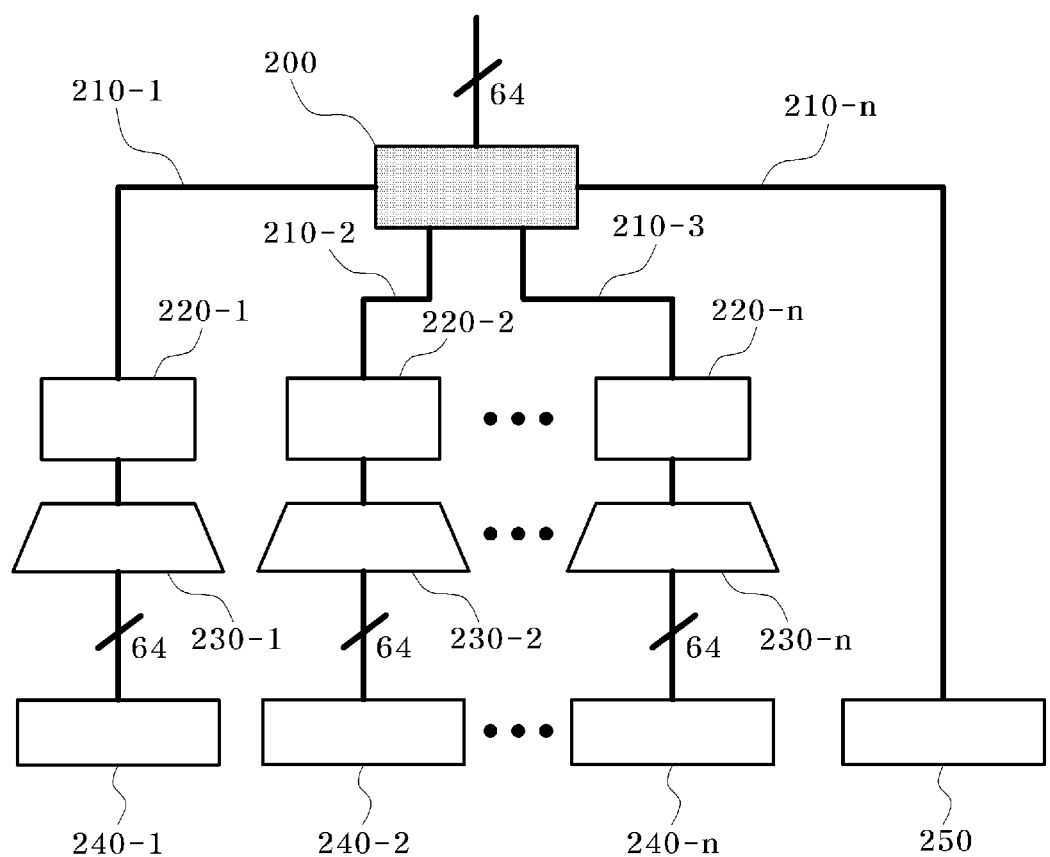
FIG. 2 is a block diagram schematically illustrating an optical I/O bus system according to a second exemplary embodiment of the present invention.
Figure 3:
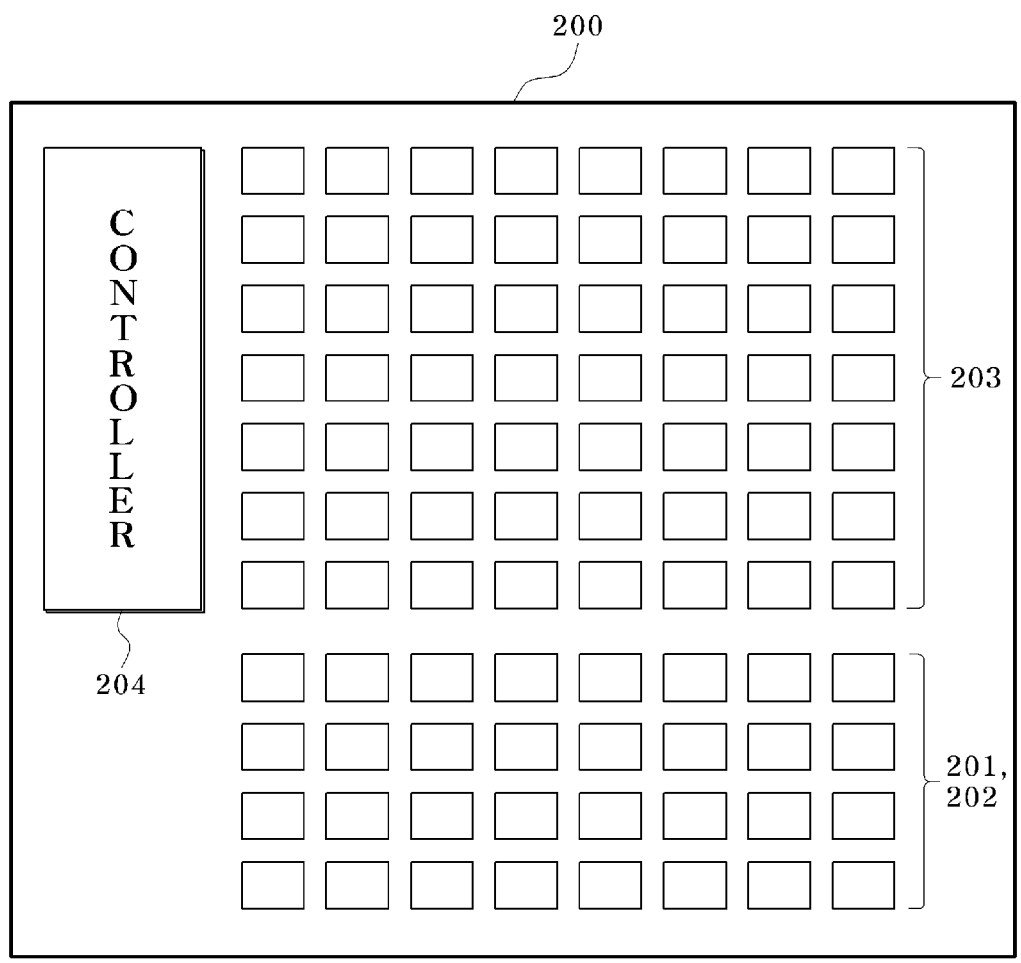
FIG. 3 is a block diagram illustrating an array module of FIG. 2 in detail.

FIG. 2 is a block diagram schematically illustrating an optical I/O bus system according to a second exemplary embodiment of the present invention, and FIG. 3 is a block diagram illustrating an array module of FIG. 2 in detail.

In comparison with the above-described first exemplary embodiment, in the optical I/O bus system according to the second exemplary embodiment of the present invention, the first SerDes 100, the first photoelectric converter 110, and the optical switch 120 that communicate with the north bridge are implemented as an array module 200. In the optical I/O bus system according to the second exemplary embodiment of the present invention, delay caused by the first SerDes 100 can be effectively removed, and the array module 200 can serve as a switch.

For convenience, a difference from the first exemplary embodiment of FIG. 1 will now be described with reference to FIGS. 2 and 3. The optical I/O bus system according to the second exemplary embodiment of the present invention briefly includes the array module 200, a plurality of optical transmission modules 210-1 to 210-n, a plurality of photoelectric converters 220-1 to 220-n, a plurality of SerDeses 230-1 to 230-n, a plurality of electrical slots 240-1 to 240-n, and so on.

Here, the array module 200 functions to connect a PCB that is connected from a CPU, memory or PCI bus to the north bridge with the optical transmission modules 210-1 to 210-n connected with an I/O according to an address.

The array module 200 includes an LD array 201 in which a plurality of LDs converting an electrical signal output from the CPU and/or memory into an optical signal are arranged in the form of an array, a PD array 202 in which a plurality of PDs converting an optical signal output from an external device into an electrical signal are arranged in the form of an array, a transceiver array 203 in which a plurality of transceivers transceiving the electrical signals are arranged in the form of an array, and a controller 204 that control the LD array 201, the PD array 202, and the transceiver array 203 to connect the CPU and/or memory with the external device using an optical signal according to the address of an input signal.

In other words, in the array module 200, a plurality of transceivers, PDs, and LDs are arranged in the form of arrays. Thus, the array module 200 simultaneously performs the functions of the optical switch 120 and the first photoelectric converter 110 employed in the above-described first exemplary embodiment as a device connected to respective electrical lines and the optical transmission modules 210 to 210-n, for example, an optical PCB.

Meanwhile, the other components, that is, the optical transmission modules 210-1 to 210-n, the photoelectric converters 220-1 to 220-n, the SerDeses 230-1 to 230-n, the electrical slots 240-1 to 240-n, an optical slot 250, etc. are the same as those of the above-described first exemplary embodiment, and thus detailed description on the components will be omitted.

When the I/O bus of a computer is replaced with an optical I/O bus based on an optical connection according to an exemplary embodiment of the present invention constituted as described above, a bottleneck caused by difference in the amount of transmission data between buses can be resolved as mentioned above, and thus it is possible to provide a basic environment in which each device can show its maximum performance.

In particular, an optical channel interface, such as an Ethernet interface, that directly uses an optical signal can be directly connected to the system without photoelectric conversion, and thus latency can be reduced. Also, a sufficient bandwidth for the data throughput of I/O devices whose operating speed is increasing is provided, so that the high-speed I/O devices can receive a signal at their maximum operating speed.

For example, an exemplary embodiment of the present invention may use a 40 gigabyte SerDes, and include an optical switch having the same performance as the SerDes or a device equivalent to the optical switch. When 62 bit data is transferred, a transmission speed of 624 Mbps per channel can be supported, and also a transmission speed above 624 Mbps per channel may be supported according to a device constituting an exemplary embodiment of the present invention.

Since optical connection according to an exemplary embodiment of the present invention does not generate an electromagnetic (EM) field, the problem of crosstalk between high-speed devices can be solved, and it is possible to provide an environment in which a plurality of high-speed devices can be integrated close to each other.

Unlike an electrical interconnection formed of copper, etc., an optical waveguide employed in an exemplary embodiment of the present invention does not operate as an impedance. Thus, impedance mismatching, which occurs when a plurality of external devices are simultaneously connected with a bus system, does not occur, and a signal can be transferred without signal distortion caused by impedance mismatching.

Furthermore, for optical connection according to an exemplary embodiment of the present invention, an optical waveguide may be stacked in an optical PCB. Thus, it is easy to use a space outside the PCB, a clear appearance is obtained, and stability can be ensured against external physical and chemical impacts.

As described above, in an exemplary embodiment of the present invention, an I/O bus system is implemented using an optical PCB and optical connection technology in a computer system, and so on. Thus, the optical I/O bus system can provide a terabyte bandwidth, thereby effectively resolving a bottleneck in a computer resulting from an increase in the operating speed of I/O devices. Also, an EM field is minimized, so that crosstalk can be minimized.

In an exemplary embodiment of the present invention, information is transferred over a computer I/O bus using optical transmission instead of electrical transmission. Thus, bottlenecks can be reduced, and the data transfer rate of a whole computer can be effectively increased.

In an exemplary embodiment of the present invention, a transmission channel does not operate as an impedance even at the transfer rate of an I/O bus using an optical signal, and impedance matching is not necessary. Thus, even if a plurality of external devices connected in parallel are used, it is possible to effectively prevent signal distortion caused by impedance mismatching due to the property of photons that photons are independent of impedance matching.

In an exemplary embodiment of the present invention, an optical signal supporting a much higher information transfer rate than an electrical signal is used. Thus, it is possible to transfer data without a bottleneck even if data throughputs are out of balance.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An optical input/output (I/O) bus system for connecting a plurality of external devices with a central processing unit (CPU) or memory in a specific system using an optical signal, comprising:

an array module including a laser diode (LD) array configured to convert an electrical signal output from the CPU or memory into an optical signal, a photonic diode (PD) array configured to convert the optical signal output from the external devices into an electrical signal, a transceiver array configured to transceive the electrical signals, and a controller configured to control the PD array, the LD array, and the transceiver array to connect the CPU or memory with a corresponding external device using the optical signal according to an address of an input signal;

a plurality of optical transmission means disposed in parallel to transfer the optical signal converted by the array module; and a plurality of optical slots connected to the respective optical transmission means to connect the external devices so that the optical signal is input/output.

2. The optical I/O bus system of claim 1, further comprising:

at least one photoelectric converter connected with the array module through at least one of the optical transmission means, and configured to convert an electrical signal into an optical signal or an optical signal into an electrical signal;

at least one serializer and deserializer (SerDes) connected with the photoelectric converter, and configured to divide a serial electrical signal into parallel electrical signals or combine parallel electrical signals into a serial electrical signal; and at least one electrical slot connected with the SerDes to connect the external devices so that the serial/parallel electrical signals are input/output.

3. The optical I/O bus system of claim 1, wherein the specific system is a computer system.

4. The optical I/O bus system of claim 1, wherein the optical transmission means is an optical printed circuit board (PCB) formed by stacking an optical waveguide made of an optical fiber or polymer on a PCB.

5. An optical input/output (I/O) bus system for connecting a plurality of external devices with a central processing unit (CPU) or memory in a specific system using an optical signal, comprising:

an array module including an laser diode (LD) array configured to convert an electrical signal output from the CPU or memory into an optical signal, a photonic diode (PD) array configured to convert an optical signal output from the external devices into an electrical signal, a transceiver array configured to transceive the electrical signals, and a controller configured to control the PD array, the LD array, and the transceiver array to connect the CPU or memory with a corresponding external device using the optical signal according to an address of an input signal;

a plurality of optical transmission means disposed in parallel to transfer the optical signal converted by the array module;

a plurality of photoelectric converters connected to the array module through the respective optical transmission means, and configured to convert an electrical signal into an optical signal or an optical signal into an electrical signal;

a plurality of serializer and deserializers (SerDeses) connected with the respective photoelectric converters, and configured to divide a serial electrical signal into parallel electrical signals or combine parallel electrical signals into a serial electrical signal; and a plurality of electrical slots connected to the respective SerDeses to connect the external devices so that the serial/parallel electrical signals are input/output.

6. The optical I/O bus system of claim 5, further comprising a plurality of optical slots connected to at least one of the optical transmission means to connect the external devices so that the optical signal is input/output.

* * * * *